(12) United States Patent
Horie et al.

(10) Patent No.: US 7,274,805 B2
(45) Date of Patent: Sep. 25, 2007

(54) METHOD OF DRIVING SURVEILLANCE CAMERA BY USING ROTARY ELECTRIC MACHINE

(75) Inventors: Noboru Horie, Tokyo-to (JP); Masafumi Sakamoto, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 804 days.

(21) Appl. No.: 10/650,711

(22) Filed: Aug. 29, 2003

(65) Prior Publication Data

US 2004/0041909 A1 Mar. 4, 2004

(30) Foreign Application Priority Data

Sep. 2, 2002 (JP) ............................. 2002-256310

(51) Int. Cl.
*G06K 9/00* (2006.01)
(52) U.S. Cl. ...................... 382/118; 382/118; 382/285; 348/143; 348/211.4; 348/357; 74/640; 74/840
(58) Field of Classification Search ................ 382/103, 382/107, 118, 285, 291, 312; 348/143, 151, 348/211.4, 357, 373–375; 74/640, 840
See application file for complete search history.

(56) References Cited

U.S. PATENT DOCUMENTS

| | | | | |
|---|---|---|---|---|
| 5,111,288 A | * | 5/1992 | Blackshear | 348/143 |
| 5,418,567 A | * | 5/1995 | Boers et al. | 348/375 |
| 5,627,616 A | * | 5/1997 | Sergeant et al. | 396/427 |
| 5,764,786 A | * | 6/1998 | Kuwashima et al. | 382/107 |
| 5,929,904 A | * | 7/1999 | Uchida | 348/211.7 |
| 6,028,626 A | * | 2/2000 | Aviv | 348/152 |
| 6,130,704 A | * | 10/2000 | Ely et al. | 348/143 |
| 6,392,693 B1 | * | 5/2002 | Wakiyama et al. | 348/143 |
| 6,477,918 B2 | | 11/2002 | Sakamoto | |
| 6,509,926 B1 | * | 1/2003 | Mills et al. | 348/143 |
| 6,628,338 B1 | | 9/2003 | Elberbaum et al. | |
| 6,707,189 B2 | * | 3/2004 | Ito et al. | 310/75 R |
| 6,820,980 B1 | * | 11/2004 | Romanoff et al. | 352/243 |
| 6,977,676 B1 | * | 12/2005 | Sato et al. | 348/211.11 |

* cited by examiner

*Primary Examiner*—Sheela Chawan
(74) *Attorney, Agent, or Firm*—Oblon, Spivak, McClelland, Maier & Neustadt, P.C.

(57) ABSTRACT

There is no surveillance camera system optimum for monitoring an important monitor place by a surveillance camera mainly for crime prevention day and night without humans in attendance, which can automatically monitor the place without humans in attendance and, when something suspicious is found, follow the suspicious without humans in attendance, and accurately monitor the suspicious at high precision. The present invention provides a surveillance camera driving method achieving such a system having the function of obtaining video image signals by two or more surveillance cameras each having a three-dimensional positioning pan tilt head function, organically processing the video information, comparing the processed information with input data of a plane picture or the like or data of pictures of a front view and a side view or the like, and determining whether the processed video signal is the same as the input data or not.

6 Claims, 4 Drawing Sheets

METHOD OF DRIVING SURVEILLANCE CAMERA BY USING ROTARY ELECTRIC MACHINE

BACKGROUND OF THE INVENTION

1. Field of the Invention

The present invention relates to a method of driving a surveillance camera by using a rotary electric machine which is optimum for driving a surveillance camera or the like.

2. Description of the Related Art

In the case of monitoring an important monitor place by a surveillance camera mainly for preventing crime all day long without humans in attendance, a surveillance camera system which can be three-dimensionally positioned is necessary. A surveillance camera is used, which is driven by a panning motor of horizontal rotation and a tilting motor for vertically moving the camera being horizontally driven.

FIG. 4 is a diagram showing the configuration of a conventional surveillance camera which is three-dimensionally positioned. Shown in the diagram are a motor 31 for driving a horizontal shaft, an output pinion 32 of the motor 31, a reduction gear 33 which meshes with the output pinion 32, and a cylindrical shaft 35 for horizontally rotating a camera 10. The cylindrical shaft 35 is supported by upper and lower chassises 42 via bearings 34 having a large inside diameter.

The upper and lower chassises 42 are fixed by pillars 44. Also shown are a tilting motor 37, a pinion 38 of the tilting motor 37, a gear 39 which meshes with the pinion 38, bearings 40, a mounting plate 7, and the camera 10.

If a slip ring is not used, however, after continuously rotating in one direction a plurality of times, a lead cable for supplying power to the tilting motors and the camera is twisted and the camera becomes unable to rotate. Even when the slip ring is used, if the horizontal rotation shaft of the rotary electrical machine and that of the camera are not concentric, the structure is complicated, and the outer shape is large. Consequently, the camera is conspicuous and is not always suited to the purpose of this kind.

There is no surveillance camera system optimum for monitoring an important monitor place by a surveillance camera mainly for crime prevention day and night without humans in attendance, which can automatically monitor the place without humans in attendance and, when something suspicious is found, follow the suspicious without humans in attendance, and accurately monitor the suspicious at high precision. It is therefore an object of the invention to develop a surveillance camera driving method capable of solving the problems.

SUMMARY OF THE INVENTION

To achieve the object, according to a first aspect of the invention, a method of driving a surveillance camera using a rotary electric machine is provided in which the rotary electric machine for horizontally rotating (panning) a camera has a hollow in the center of its rotary shaft and, further, has a reduction gear having a hollow in its center concentrically with the rotary shaft in the case of decelerating a rotation output of the rotary electric machine, a slip ring is concentrically provided in the hollow including a hollow output shaft of the reduction gear or a side face of the hollow output shaft, power supply of the rotary electric machine for vertically moving (tilting) the camera and passage of the power and video signals of the camera attached to the rotary electric machine for vertical driving, that is, passage of power between a stationary side and a movable side is performed via the slip ring, and camera video signals of the same place are compared with each other a plurality of times or a subtraction is executed between the (n−1)th video signal and the n-th video signal (n: an integer of 2 or larger) by using a surveillance camera driving method capable of continuously rotating the camera in the horizontal direction and performing three-dimensional positioning, thereby enabling the existence of a deviation in video images to be recognized.

According to a second aspect of the invention, the method of driving a surveillance camera using a rotary electric machine is provided, wherein the camera is directed toward the position where a deviation occurs in video images by a panning motor and a tilting motor, and the video signal is obtained.

According to a third aspect of the invention, the method of driving a surveillance camera using a rotary electric machine is provided, wherein even when the position where a deviation occurs in video images changes momentarily, position information is given to a panning motor and a tilting motor in accordance with the position where the deviation occurs of the camera video signal, the camera is continuously directed toward the place where the deviation occurs, and the video signal is continuously obtained.

According to a fourth aspect of the invention, the method of driving a surveillance camera using a rotary electric machine is provided, further including the function of giving an alarm to a surveillant when the deviation is equal to or larger than a reference value.

According to a fifth aspect of the invention, the method of driving a surveillance camera using a rotary electric machine is provided, further including a signal output function of giving a sound alarm to the place where the deviation occurs or turning on light when the deviation is equal to or larger than the reference value.

According to a sixth aspect of the invention, a method of driving a surveillance camera using a rotary electric machine is provided, wherein the rotary electric machine for horizontally rotating (panning) a camera has a hollow in the center of its rotary shaft and, further, has a reduction gear having a hollow in its center concentrically with the rotary shaft in the case of reducing a rotation output of the rotary electric machine, a slip ring is concentrically provided in the hollow including a hollow output shaft of the reduction gear or a side face of the hollow output shaft, power supply of the rotary electric machine for vertically moving (tilting) the camera and passage of the power and video signals of the camera attached to the rotary electric machine for vertical driving are performed via the slip ring, the face or the like of a moving person or animal is followed for predetermined time to obtain video images of the face, and the video image is compared with a video image of a wanted person or animal to thereby make identification by using a surveillance camera driving method capable of continuously rotating the camera in the horizontal direction and performing three-dimensional positioning.

According to a seventh aspect of the invention, a surveillance camera driving method is provided, which has a function of obtaining video image signals by two or more surveillance cameras each having a three-dimensional positioning panhead function, organically processing the video information, and comparing the processed information with input data of a picture of a plan view or the like or data of pictures of a full face and a profile, thereby determining whether the processed information is the same as the input information or not.

DESCRIPTION OF THE PREFERRED EMBODIMENT

Embodiment

Figure 1:
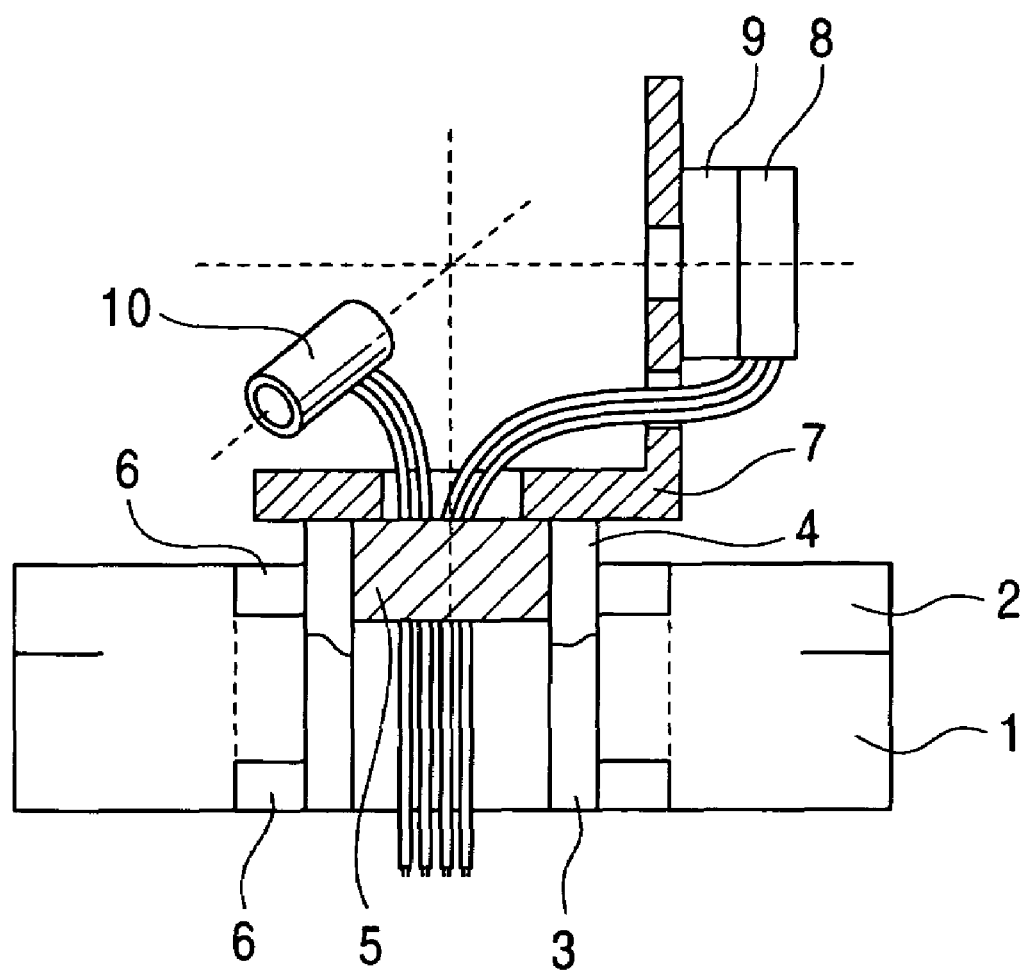
FIG. 1 is a diagram showing the structure of a surveillance camera used for the invention.

FIG. 1 is a conceptual diagram of a surveillance camera driving apparatus capable of performing three-dimensional positioning optimum for the invention.

Shown in the diagrams are a rotary electric machine 1 for horizontal rotation (hereinbelow, also called "horizontal shaft driving motor", "panning motor" or, simply, "motor"), a reduction gear 2 of the rotary electric machine 1, a motor hollow shaft 3, a reduction gear hollow output shaft 4, a slip ring 5, and bearings 6.

Reference numeral 7 denotes a metal fitting or the like of an L-letter shape which is fixed to the reduction gear hollow output shaft 4, having the role of fixing a reduction gear 9 assembled in a tilt motor (or tilting motor) 8, and moving the camera 10 in the vertical direction by the output shaft 4 of the attached reduction gear.

Supply of power to the tilt motor 8 and the camera 10 and output of a video signal of the camera 10 are led to a stationary portion via the slip ring 5.

Specifically, a group of lead wires are led to the tilt motor 8 and the camera 10 via the slip ring 5 provided in the hollow of the horizontal shaft driving motor 1.

FIG. 1 shows an example. Both of a driver for the tilt motor 8 and a driver for the panning motor 1 may be mounted on the L-shaped metal fitting 7 or the like in the movable portion. In this case, power is supplied from the stationary side via the slip ring 5 to the drivers and the camera 10, and video information of the camera 10 is supplied to the stationary side via the slip ring 5.

In this case, the number of pins of the slip ring 5 can be reduced, so that the cost of the slip ring 5 can be reduced.

Since the slip ring 5 is provided in the hollow of the panning motor or the like, it becomes small and compact. Thus, a compact panhead can be formed.

When a three-phase stepping motor is employed as the rotary electric machine 1 for horizontal rotation, the surveillance camera 10 having a simple drive circuit, small noise vibration, and excellent cost performance capable of performing high-speed positioning is realized. Further, by driving the three-phase stepping motor in micro steps, the vibration noise can be further reduced.

In the case of monitoring a safe in a bank at night or a door of a house where nobody stays from a high place or the like, the camera 10 continuously, periodically photographs the target place and the data of the video image captured is processed, thereby enabling a change in the place to be recognized.

By comparing camera video image signals of the same place continuously or a plurality of times or by setting "n" as an arbitrary integer and subtracting a video signal of the (n−1)th time from a video signal of the (n)th time, if an abnormality occurs, a deviation appears in video images, so that the occurrence of the abnormality can be recognized.

That is, the object can be achieved by the method. In this case, it is desirable that the surveillance camera be small, high-speed, adapted to operations such as free rotation in every directions or continuously in the same direction, and not-noisy. The configuration of FIG. 1 is optimum for the desirable surveillance camera.

When a deviation in video images is found by the driving apparatus of FIG. 1, the camera 10 is oriented to the position where the deviation occurs in the video image by the panning motor 1 and the tilting motor 8 and a video signal can be obtained.

Even if the position in which the video image varies changes momentarily, it is possible to give positional information to the panning motor 1 and the tilting motor 8 in accordance with the deviation position of the camera video signal, keep on directing the camera 10 toward the deviation position, and continuously obtain the video signal.

Alternatively, it is possible to provide a function of giving an alarm to the monitor (the user) when the deviation of the video image is equal to or larger than a reference value.

It is also possible to provide a signal output function of giving a sound alarm to the place where the deviation occurs or turning on light when the deviation of the video image is equal to or larger than a reference value to warn a person who makes a forcible entry.

As another application of the surveillance camera of FIG. 1 and the like of the proposal, the surveillance camera is optimum to find a criminal, a witness, a related person, and the like among passengers who pass the gates at an airport or the like.

For this purpose, video images are captured by a plurality of cameras in a plurality of places and data of a larger amount of, for example, a face can be used. It is also possible to synthesize an image of a full face and an image of a profile from the plurality of pieces of data and compare the synthesized images with full-face data or profile data which is input in advance by using a computer or the like. If the input data is data of the full face and the profile, identification of a person can be done more accurately. In this case, the camera cannot be practically used if it cannot be instantaneously adjusted at the optimum position angle to the object at high speed. Specifically, the face of a human, an animal, or the like who is passing a gate is photographed for predetermined time, and the image obtained is compared with a target human or animal for a match.

However, there is a case such that people who passes in a hurry does not always face forward but may face sideward.

In such a case, to increase the precision of determination, a surveillance camera driving method is extremely effective, which obtains video signals by two or more surveillance cameras each having a three-dimensional positioning panhead function, organically processes the video information, compares the processed video information with data of an input picture of a plan view or the like or data of pictures of a full face and a profile or the like, and determines whether the video information matches the input information or not.

Figure 2A:
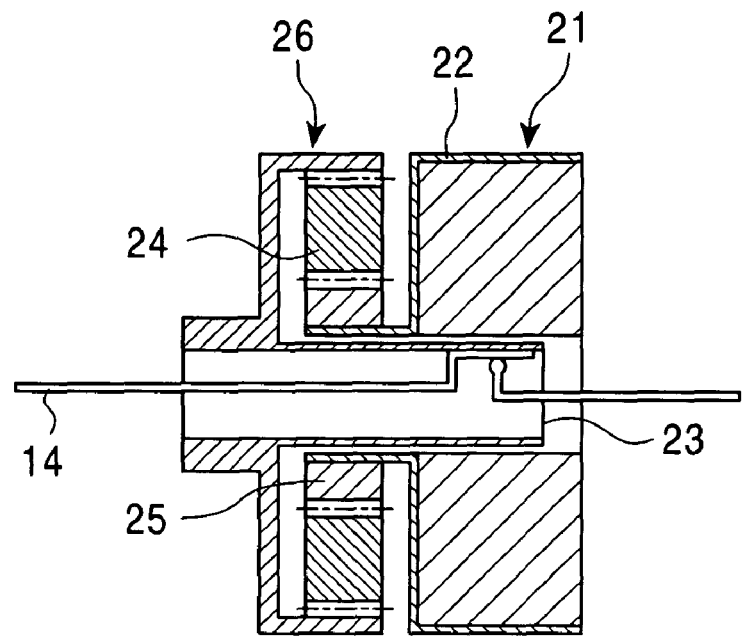
FIGS. 2A and 2B are diagrams showing the configuration of a motor used for the invention.

FIG. 2A is a sectional side view showing an example of the internal structure of the motor 1 for horizontal rotation of FIG. 1.

Figure 2B:
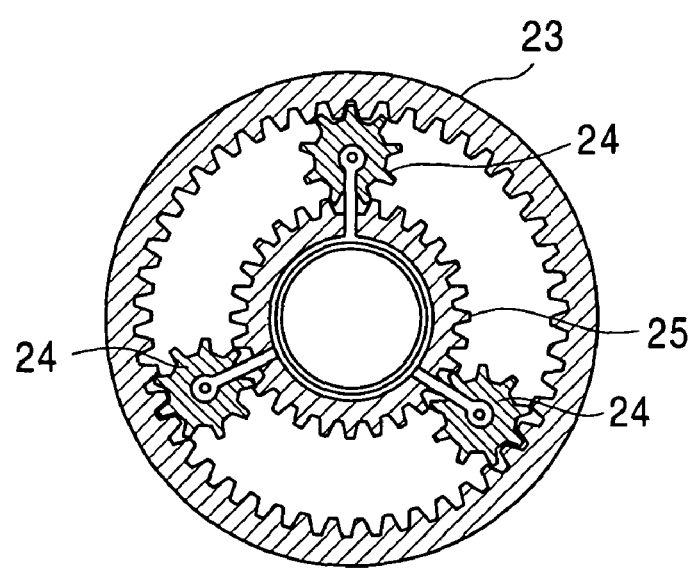

The rotary electric motor 1 for horizontal rotation may be of an inner rotor type or an outer rotor type. FIGS. 2A and 2B show a motor 21 of the outer rotor type.

Reference numeral 22 denotes a hollow output shaft. Reference numeral 26 denotes a reduction gear. In a surveillance camera, to suppress an influence of the inertia of the camera and the tilting motor 8 and a positional deviation between the position when the motor is ON and the position when the motor is OFF, the moderator is usually used.

Reference numeral 23 denotes a slip ring, and reference numeral 14 indicates a lead wire of the slip ring 23.

FIG. 2B is a front view of the case where the reference numeral 26 is a planetary gear.

Reference numeral 24 denotes a planetary gear, 25 denotes a sun gear having a hollow portion, and 23 indicates an internal gear.

Figure 3:
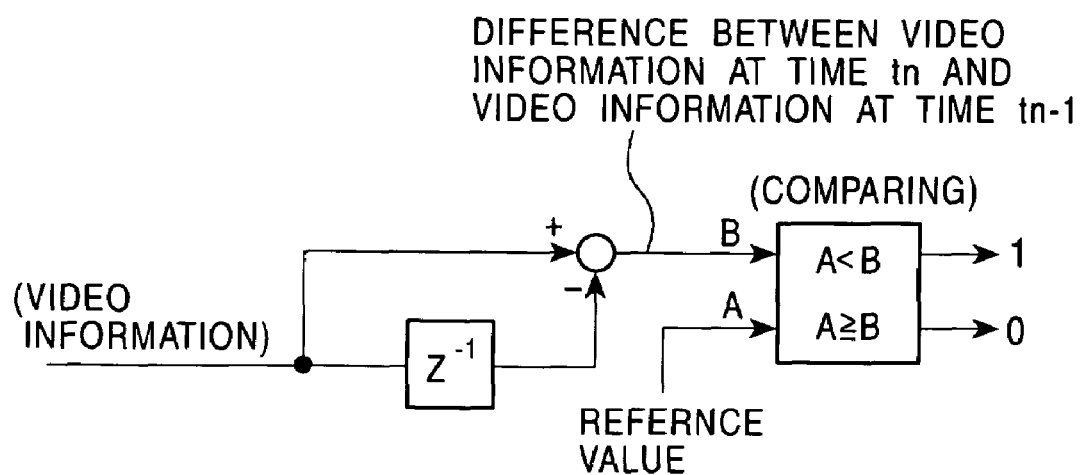
FIG. 3 is a block diagram of an abnormal value finding circuit of the invention.

FIG. 3 is a block diagram showing the principle of recognizing the existence of a deviation in video images by comparing camera video signals in the same place a plurality of times or by performing subtraction between a video signal of the (n−1)th time and a video signal of the n-th time.

When a deviation occurs in the video images, a deviation value is compared with a reference numeral. If the deviation value is larger than the reference value, by an output of the comparison circuit, generation of an alarm as the subsequent operation is performed.

Specifically, by the subtraction of the signal of the n-th time and the signal of the (n−1)th time, a deviation value B is obtained. The deviation value B is compared with a reference value A. When B is larger than A, a signal is output from the comparison circuit and the operation moves to the operation of giving an alarm or the like as subsequent operation. Consequently, the surveillance camera has to be a surveillance camera capable of periodically sampling a video image in an arbitrary same position freely and three-dimensionally.

Figure 4:
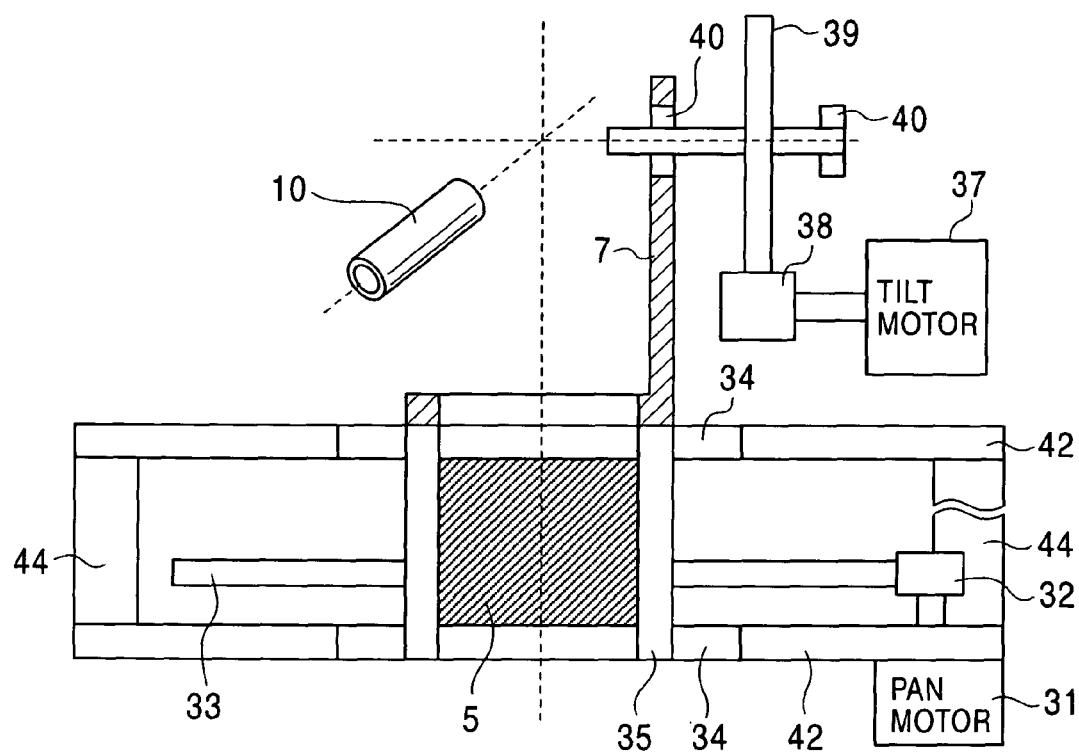
FIG. 4 is a diagram for illustrating the principle of a conventional technique.

FIG. 1 showing the configuration of the present invention is compared with FIG. 4 showing the conventional configuration as follow.

1) In FIG. 1, the motor 1 also serves as the chassis 42 and the pillow 44 of FIG. 4.

2) Although the rotary shaft of the panning motor 31 and that of the slip ring 5 of FIG. 4 are different from each other, in FIG. 1, the motor 1 and the slip ring 5 are disposed concentrically.

It is understood from the above that the surveillance camera is small and has a small number of parts. By using a three-phase stepping motor as each of the motor 1 for horizontal rotation and the tilting motor 8, noise vibration can be reduced.

EFFECTS OF THE INVENTION (1) An image is obtained in the same position a plurality of times by a surveillance camera apparatus having a panhead mechanism using a panning motor in which a slip ring is disposed in a hollow shaft or the like and the plurality of image signals are subjected to a background subtraction process, thereby enabling a deviation in the images to be easily and accurately obtained. From the deviation information, the place where the deviation occurs can be traced. By giving an alarm to the monitor (user) or an intruder, a crime can be prevented.

(2) The surveillance camera can be also provided with the function of continuously capturing images of the face or the like of a moving person or animal by the camera apparatus of the proposal for predetermined time and comparing the captured images with video images of a wanted person or animal, thereby enabling identification to be made.

(3) A method of driving a surveillance camera having a high-precision determining function can be realized, which obtains video signals by two or more surveillance cameras each having a three-dimensional positioning panhead function, organically processing video information, and comparing the processed video image with input data of a picture of a plan view or the like or data of a full face picture and a profile picture to thereby determine whether the obtained video image is the same as the input information or not at high precision.

The invention claimed is:

1. A method of driving a surveillance camera, comprising the steps of:

using a rotary electric machine for horizontally rotating (panning) the camera, wherein the rotary electric machine has a hollow in the center of its rotary shaft and, further, has a reduction gear having either a hollow in its center which is concentric with the rotary shaft or a hollow output shaft at least in its output part in the case of decelerating a rotation output of the rotary electric machine, a slip ring concentrically provided in the hollow including the hollow output shaft of the reduction gear or a side face of the hollow output shaft, passing power or an electric signal between a stationary portion and a movable portion of the surveillance camera via said slip ring, performing three-dimensional positioning of the surveillance camera, capturing camera video signals of a certain place at n times, and comparing the n camera video signals of the certain place or subtracting the (n−1)th video signal and the n-th video signal (n: an integer of 2 or larger), thereby enabling a deviation in video images to be recognized.

2. The method of driving a surveillance camera using a rotary electric machine according to claim 1, including the step of operating the rotary electric machine to direct the camera toward the position where a deviation occurs in the video images.

3. The method of driving a surveillance camera using a rotary electric machine according to claim 1, including the step of operating the rotary electric machine to direct the camera to a position where a momentary deviation occurs in the video images, by giving position information to said rotary electric machine.

4. The method of driving a surveillance camera using a rotary electric machine according to any of claims 1 to 3, further comprising the step of issuing an alarm to a surveillant when the deviation is equal to or larger than a reference value.

5. The method of driving a surveillance camera using a rotary electric machine according to any of claims 1 to 3, further comprising the step of issuing a sound alarm to the place where the deviation occurs or turning on light when the deviation is equal to or larger than the reference value.

6. A method of driving a surveillance camera, comprising the steps of:

using a rotary electric machine, wherein the rotary electric machine for horizontally rotating (panning) a camera has a hollow in the center of its rotary shaft and, further, has a reduction gear having either a hollow in its center which is concentric with the rotary shaft or a hollow output shaft at least in its output part in the case of reducing a rotation output of the rotary electric machine, a slip ring concentrically provided in the hollow including the hollow output shaft of the reduction gear or a side face of the hollow output shaft, passing power or an electric signal between a stationary portion and a movable portion of the surveillance camera via said slip ring, performing three-dimensional positioning of the surveillance camera, following a personally unique portion of a moving person or animal for predetermined time to obtain video images of the portion, comparing the video images with a video image of a wanted person or animal to thereby make an identification.

* * * * *